US011422690B2

(12) United States Patent
Kato

(10) Patent No.: US 11,422,690 B2
(45) Date of Patent: Aug. 23, 2022

(54) DISPLAY CONTROL DEVICE AND DISPLAY CONTROL METHOD

(71) Applicants: KABUSHIKI KAISHA TOSHIBA, Tokyo (JP); TOSHIBA TEC KABUSHIKI KAISHA, Tokyo (JP)

(72) Inventor: Hiroyuki Kato, Shizuoka-ken (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 17/108,005

(22) Filed: Dec. 1, 2020

(65) Prior Publication Data

US 2021/0081095 A1 Mar. 18, 2021

Related U.S. Application Data

(63) Continuation of application No. 16/292,449, filed on Mar. 5, 2019, now abandoned, which is a
(Continued)

(51) Int. Cl.
| | |
|---|---|
| *G06F 3/04842* | (2022.01) |
| *G06F 3/0488* | (2022.01) |
| *G06F 3/0486* | (2013.01) |
| *G06F 3/0482* | (2013.01) |
| *G06F 3/12* | (2006.01) |

(52) U.S. Cl.
CPC .......... *G06F 3/0488* (2013.01); *G06F 3/0482* (2013.01); *G06F 3/0486* (2013.01); *G06F 3/04842* (2013.01); *G06F 3/1204* (2013.01); *G06F 3/125* (2013.01); *G06F 3/1258* (2013.01)

(58) Field of Classification Search
CPC .. G06F 3/0488; G06F 3/0482; G06F 3/04842; G06F 3/0486; G06F 3/1204; G06F 3/125; G06F 3/1258
See application file for complete search history.

(56) References Cited

U.S. PATENT DOCUMENTS

| | | | |
|---|---|---|---|
| 7,609,401 B2 * | 10/2009 | Kujirai | G06F 3/1256 358/1.12 |
| 2001/0019423 A1 | 9/2001 | Hirai | |

(Continued)

OTHER PUBLICATIONS

Non-Final Office Action for U.S. Appl. No. 13/270,395 dated Jun. 3, 2015.
(Continued)

*Primary Examiner* — Hien L Duong
(74) *Attorney, Agent, or Firm* — Amin, Turocy & Watson LLP

(57) ABSTRACT

A list of a plurality of objects to be displayed, which corresponds to page images to be operated, respectively, is displayed; it is determined which object is selected as an object to be moved among the plurality of displayed objects to be displayed; it is determined which object is selected as a movement destination object among the plurality of displayed objects to be displayed; and allocation page images are displayed in a state where a page image corresponding to the object determined as the object to be moved and a page image corresponding to the object determined as the movement destination object are allocated to a single page.

6 Claims, 19 Drawing Sheets

Related U.S. Application Data continuation of application No. 15/047,807, filed on Feb. 19, 2016, now Pat. No. 10,268,361, which is a continuation of application No. 13/270,395, filed on Oct. 11, 2011, now Pat. No. 9,389,775.

(60) Provisional application No. 61/392,685, filed on Oct. 13, 2010.

(56) References Cited

U.S. PATENT DOCUMENTS

| | | |
|---|---|---|
| 2002/0099565 A1 | 7/2002 | Kito |
| 2006/0050337 A1 | 3/2006 | Hitaka |
| 2006/0139686 A1 | 6/2006 | Suzuki et al. |
| 2006/0250630 A1 | 11/2006 | Mori |
| 2007/0288843 A1 | 12/2007 | Makino |
| 2008/0239381 A1 | 10/2008 | Oshima |
| 2008/0256476 A1 | 10/2008 | Seo et al. |
| 2011/0018821 A1 | 1/2011 | Kii |
| 2011/0205594 A1 | 8/2011 | Chida |

OTHER PUBLICATIONS

Non-Final Office Action for U.S. Appl. No. 15/047,807 dated Jan. 10, 2018.
Final Office Action for U.S. Appl. No. 15/047,807 dated Aug. 6, 2018.
Non-Final Office Action for U.S. Appl. No. 16/292,449 dated Apr. 30, 2020.
Final Office Action for U.S. Appl. No. 16/292,449 dated Sep. 3, 2020.

* cited by examiner

FIG.7

| IDENTIFICATION INFORMATION ON OBJECTS TO BE DISPLAYED | IDENTIFICATION INFORMATION ON PAGE IMAGES TO BE ALLOCATED |
|---|---|
| O1 | P1 |
| O2 | P2 |
| O3 | P3 |
| O4 | P4 |
| O5 | P5 |

FIG.10

| IDENTIFICATION INFORMATION ON OBJECTS TO BE DISPLAYED | IDENTIFICATION INFORMATION ON PAGE IMAGES TO BE ALLOCATED |
|---|---|
| O1' | P1 |
| O2' | P2 |
|  | P3 |
|  | P4 |
| O3' | P5 |

FIG.13

| IDENTIFICATION INFORMATION ON OBJECTS TO BE DISPLAYED | IDENTIFICATION INFORMATION ON PAGE IMAGES TO BE ALLOCATED |
|---|---|
| O1″ | P1 |
| | P2 |
| | P3 |
| | P4 |
| O2″ | P5 |

DISPLAY CONTROL DEVICE AND DISPLAY CONTROL METHOD

CROSS-REFERENCE TO RELATED APPLICATIONS

This application is a Continuation of application Ser. No. 16/292,449 filed Mar. 5, 2019, which is a Continuation of application Ser. No. 15/047,807 filed Feb. 19, 2016, which is a Continuation of application Ser. No. 13/270,395 filed Oct. 11, 2011, which is based upon and claims the benefit of priority from: U.S. provisional application 61/392,685, filed on Oct. 13, 2010; the entire contents all of which are incorporated herein by reference.

FIELD

Embodiments described herein relate to a technique for allocating a plurality of page images to one page.

BACKGROUND

According to the related art, for example, so-called "Nin1 setting" is performed in printing setting or the like to allocate a plurality of page images to a single page.

When the Nin1 setting is performed, a plurality of hierarchies on a user interface screen of a printer driver or the like has to be traced up to the hierarchy of the Nin1 setting by executing a button operation a plurality of times. For this reason, an operation load on users is considerable.

DESCRIPTION OF THE DRAWINGS

FIG. 7 is a diagram illustrating a data table indicating a correspondence relationship between the objects to be displayed in FIG. 6 and page images which correspond to the objects to be displayed, respectively.

FIG. 10 is a diagram illustrating an example of a data table stored in an HDD in a state shown in FIG. 9.

FIG. 13 is a diagram illustrating an example of a data table stored in the HDD in a state shown in FIG. 12.

DETAILED DESCRIPTION

Figure 1:
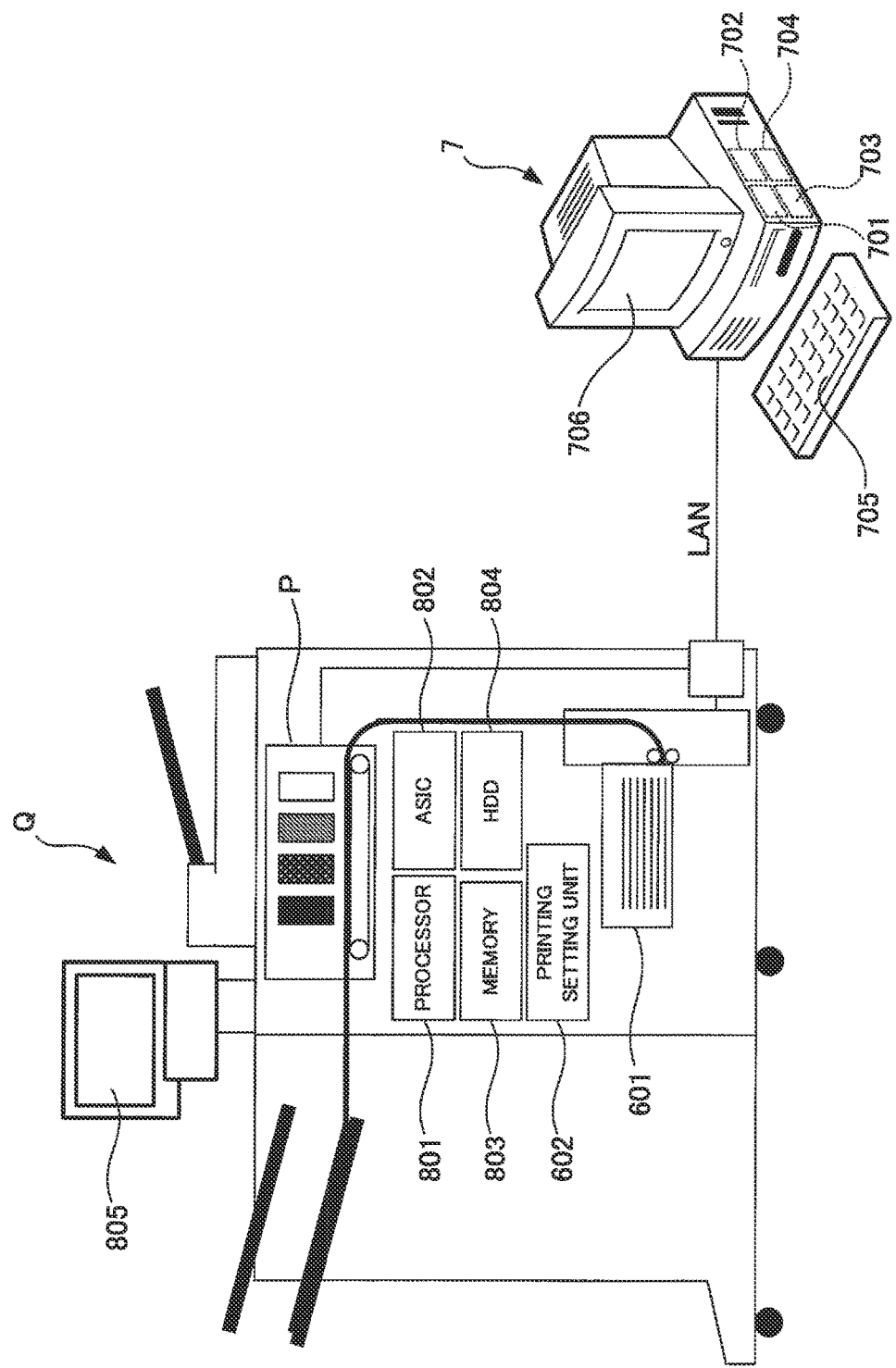
FIG. 1 is a diagram illustrating the system configuration of an image processing system according to exemplary embodiments.

In general, a display control device according to an exemplary embodiment includes a list display control unit, an operation input unit, a movement object determination unit, an object movement destination determination unit, and an allocation display control unit.

The list display control unit displays a list of a plurality of objects to be displayed, which corresponds to page images to be operated, respectively.

The operation input unit receives an input operation of a user.

The movement object determination unit determines which object is selected as an object to be moved among the plurality of objects to be displayed, which is displayed by the list display control unit, based on the input operation received by the operation input unit.

The object movement destination determination unit determines which object is selected as a movement destination object which is a movement destination of the object to be moved among the plurality of objects to be displayed, which is displayed by the list display control unit, based on the input operation received by the operation input unit.

The allocation display control unit displays an allocation page image being in a state where a page image corresponding to the object determined as the object to be moved by the movement object determination unit and a page image corresponding to the object determined as the movement destination object by the object movement destination determination unit are allocated to a single page.

In general, a display control device according to an exemplary embodiment includes an allocation display control unit, an operation input unit, an exclusion object determination unit, an object movement destination determination unit, a list display control unit.

The allocation display control unit displays an allocation page image being in a state where a plurality of objects to be displayed, which corresponds to a plurality of page images, is allocated to a single page.

The operation input unit receives an input operation of a user.

The exclusion object determination unit determines which object is selected as an object to be excluded, which is moved to be excluded from the allocation page image, among the plurality of objects to be displayed, which corresponds to a plurality of page images included in the allocation page image displayed by the allocation display control unit, based on the input operation received by the operation input unit.

The object movement destination determination unit determines a movement destination of the object to be excluded based on the input operation received by the operation input unit.

The list display control unit excludes the object to be excluded among the plurality of objects to be displayed, which is included in the allocation page image to which the object to be excluded is allocated, and displaying the object to be excluded as the object to be displayed, which is different from the allocation page image, if the object movement destination determination unit determines that a region which does not correspond to any object to be displayed, which is displayed in correspondence with the page image, is selected as the movement destination of the object to be excluded.

First Embodiment

Hereinafter, an exemplary embodiment will be described with reference to the drawings.

Figure 2:
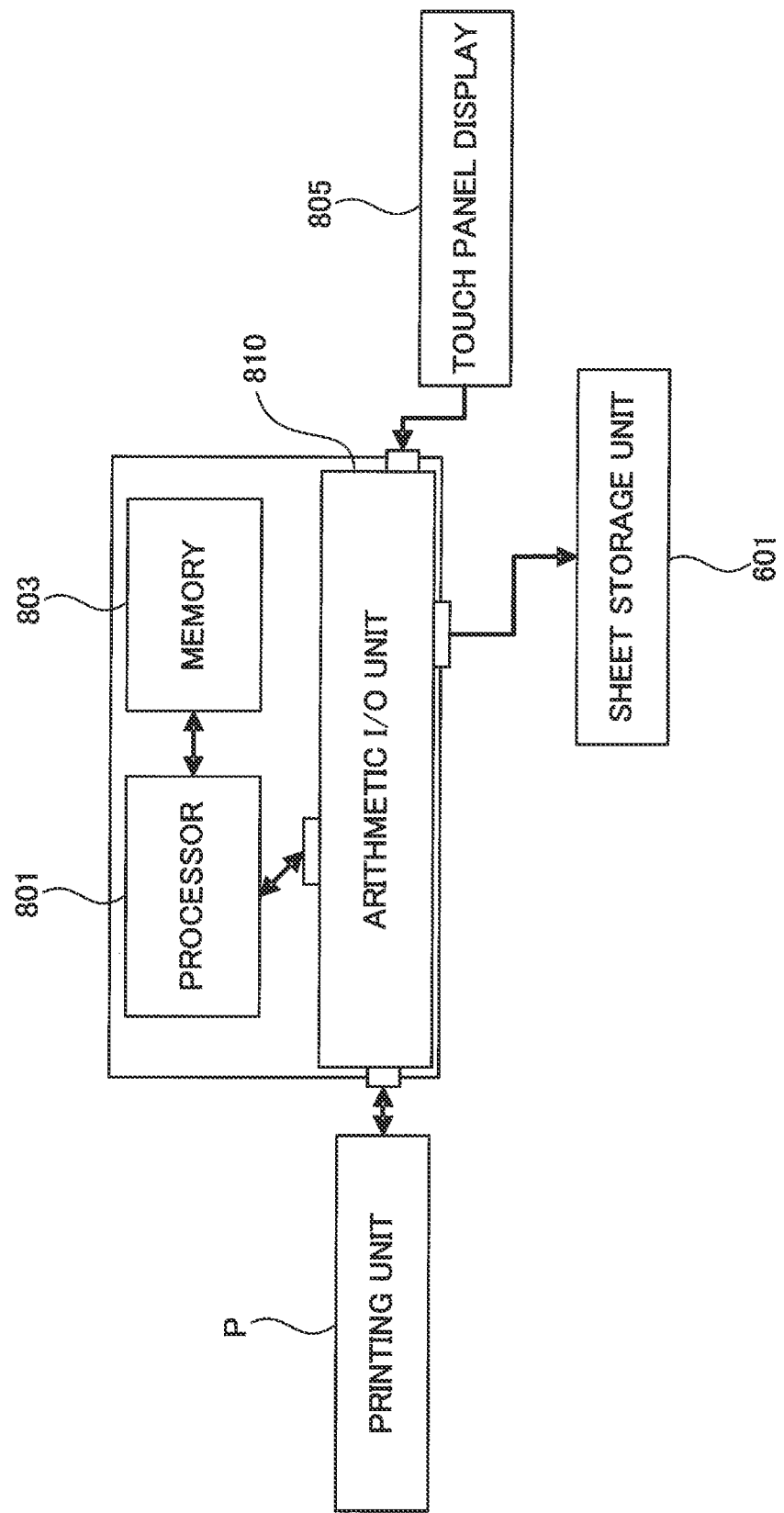
FIG. 2 is a diagram illustrating the hardware configuration of an image processing apparatus.

FIG. 1 is a diagram illustrating the system configuration of an image processing system according to the exemplary embodiment. FIG. 2 is a diagram illustrating the hardware configuration of an image processing apparatus Q.

An image processing system 900 includes a client terminal 7 and the image processing apparatus Q. The client terminal 7 and the image processing apparatus Q are connected to each other via a LAN (Local Area Network) or a WAN (wide Area Network) so as to electrically communicate with each other.

As an example, here, the image processing apparatus Q includes the display control device 1 according to the exemplary embodiment. Of course, the client terminal 7 or the like may include the display control device 1 instead of the image processing apparatus Q. If the entire system can realize the functions of the display control device 1, the various functions of the display control device 1 may be distributed to, for example, the client terminal 7, the image processing apparatus Q or the like.

For example, the image processing apparatus Q is an MFP (Multi Function Peripheral). The image processing apparatus Q includes a processor 801, an ASIC (Application Specific Integrated Circuit) 802, a memory 803, an HDD (Hard Disk Drive) 804, a touch panel display 805 having the functions of a display unit and an operation input unit, an arithmetic I/O unit 810, a sheet storage unit 601, and a printing unit P. The touch panel display 805 stores the details of a setting operation in, for example, the HDD 804 based on an input operation of a user and allows the printing unit P to perform printing based on the set details.

For example, the client terminal 7 is a PC (Personal Computer). The client terminal 7 includes a processor 701, an ASIC (Application Specific Integrated Circuit) 702, a memory 703, an HDD (Hard Disk Drive) 704, an input operation unit 705 such as a keyboard or a mouse, and a display 706.

In the image processing system according to the exemplary embodiment, the processors 801 and 701 have a role of performing various kinds of processing of the image processing system and also have a role of realizing various functions by executing a program stored in the memory 803, the memory 703, the HDD 804, the HDD 704, or the like. Of course, the processors 801 and 701 can be realized by a CPU (Central Processing Unit) or an MPU (Micro Processing Unit) that can execute equivalent arithmetic processing. Further, the HDDs 804 and 704 can be substituted by a storage device such as a flash memory.

The memories 803 and 703 can be configured by, for example, a RAM (Random Access Memory), a ROM (Read Only Memory), a DRAM (Dynamic Random Access Memory), an SRAM (Static Random Access Memory), a VRAM (Video RAM), or a flash memory. Accordingly, the memories 803 and 703 have a role of storing various kinds of information or programs used for the image processing system.

In the image processing system according to the exemplary embodiment, a user can operate a printer driver operating on the client terminal 7 in order to give a printing instruction to the image processing apparatus Q via the LAN. Based on an input operation on the touch panel display 805 of the image processing apparatus Q, printing setting and printing can also be performed in the single image processing apparatus Q.

Figure 3:
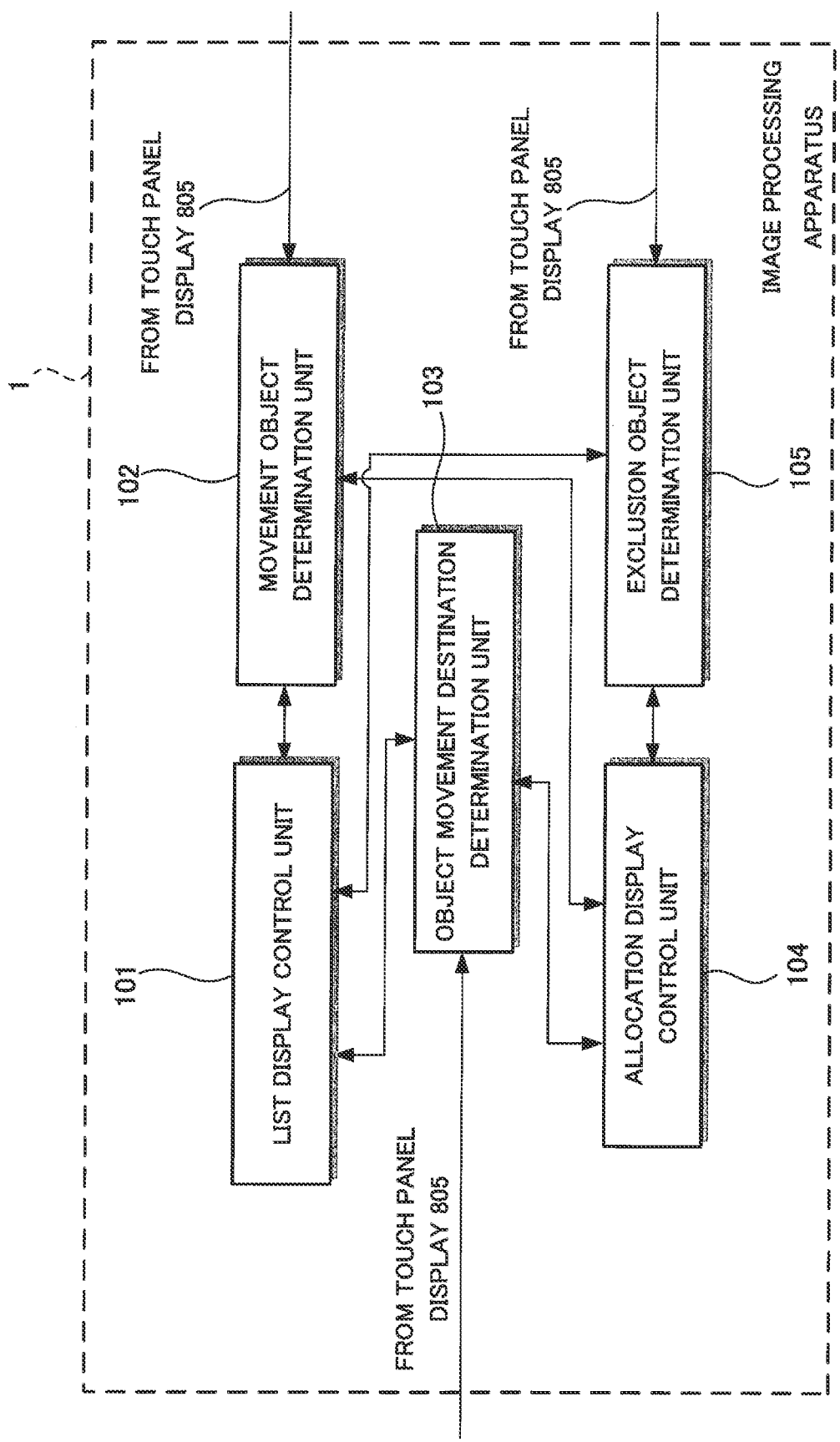
FIG. 3 is a block diagram illustrating various functions of a display control device included in the image processing apparatus.

FIG. 3 is a functional block diagram illustrating various functions of the display control device 1 included in the image processing apparatus Q.

The display control device 1 includes a list display control unit 101, a movement object determination unit 102, an object movement destination determination unit 103, an allocation display control unit 104, and an exclusion object determination unit 105.

The list display control unit 101 displays a list of a plurality of objects to be displayed, which can be made to correspond to page images to be subjected to an operation.

Based on an input operation received on the touch panel display 805, the movement object determination unit 102 determines whether a given object is selected as an object to be moved among the plurality of objects to be displayed, which are displayed by the list display control unit 101.

Based on an input operation received on the touch panel display 805, the object movement destination determination unit 103 determines whether a given object is selected as a movement destination object, which is a movement destination of the object to be moved, among the plurality of objects to be displayed, which are displayed by the list display control unit 101.

The allocation display control unit 104 displays an allocation page image which is in a state where a page image corresponding to the object determined as the object to be moved by the movement object determination unit 102 and a page image corresponding to the object determined as the movement destination object by the object movement destination determination unit 103 can be allocated to a single page.

Thus, it is possible to obtain the allocation page image, which is in the state where both the display objects can be allocated to a single page, just by selecting any object among the plurality of objects to be displayed, which appears in the list and moving the selected object to a region corresponding to any object.

In a user interface of a printer driver according to the related art, the number of pages allocated to a single page has to be first set on an allocation setting screen in order to perform allocation setting. However, according to the technique according to the exemplary embodiment, the allocation setting can be performed with a lesser number of operations.

Further, in the allocation setting of the printer driver according to the related art, the allocation setting to be performed is applied to all the pages of an original document to be set. Therefore, the allocation setting may not be performed to only a specific page of the original document. According to the technique according to the exemplary embodiment, however, any pages of the original document can be selected so as to be allocated, thereby achieving flexible allocation setting.

The allocation display control unit 104 determines a positional relationship between the page image corresponding to the object to be moved and the page image corresponding to the object determined as the movement destination object in accordance with a location to which the object determined as the object to be moved by the movement object determination unit 102 is moved in a region corresponding to the object determined as the movement destination object by the object movement destination determination unit 103.

In the allocation setting of allocating and disposing the plurality of page images on a single page, a user sometimes desires to arbitrarily arrange the respective images on the page. According to this configuration, even if the user desires to arbitrarily arrange the respective images, the allocation location on the page can simply be determined as the result of the object to be moved just by controlling the movement destination of the selected object to be moved in the region corresponding to the object to be moved.

Specifically, for example, when the movement destination of the object to be moved is on the upper side of the middle of the movement destination object, the movement destination of the object to be moved may be allocated to a page location in the front of each page image. When the movement destination of the object to be moved is on the lower side of the middle of the movement destination object, the movement destination of the object to be moved may be allocated to a page location in the rear of each page image.

An operation of selecting an object to be moved among a plurality of objects to be displayed, which is displayed by the list display control unit 101, is performed through dragging.

An operation of selecting the movement destination object which is the movement destination of the object to be moved among the plurality of objects to be displayed, which is displayed by the list display control unit 101, is performed through releasing.

Of course, the operation of selecting the object to be moved is not limited to dragging. For example, this operation may be performed by an algorithm for recognizing the object to be moved just by selection. Further, the operation of selecting the movement destination object may be performed through, for example, dropping or simple selection known as operations of a mouse. That is, under an environment of the user interface operation, any operation may be performed as long as the "object to be moved" and the "movement destination object" can be selected consequently.

Based on an input operation received on the touch panel display 805, the exclusion object determination unit 105 determines which object is selected as an object to be excluded, which is to be moved and excluded from the allocation page images, among the plurality of objects to be displayed, which corresponds to the plurality of page images included in the allocation page images displayed by the allocation display control unit 104.

Based on an input operation received on the touch panel display 805, the object movement destination determination unit 103 determines the movement destination of the object to be excluded.

When the object movement destination determination unit 103 determines, as the movement destination of the object to be excluded, a region which does not correspond to any object to be displayed, which are displayed in correspondence with the page image, the list display control unit 101 excludes the object to be excluded from the plurality of objects to be displayed, which is included in the allocation page images to which the object to be excluded is allocated and displays the object to be excluded as an object to be displayed, which is different from the allocation page images.

Thus, just by moving any object among the plurality of display objects to be displayed, which is included in the allocation page images, to the outside of the allocation page images, it is possible to simply adjust the number of page images to be allocated to the allocation page images.

Further, when the excluded object to be excluded is moved to the region corresponding to another object to be displayed, it is possible to obtain this object to be displayed and the allocation page image to which the object to be excluded is allocated.

Of course, as the specification of the user interface, the plurality of objects to be displayed can be selected simultaneously as the objects to be excluded.

For example, the allocation page images can be set so that the number of pages of a multiple of 2 can normally be allocated.

When the number of objects to be displayed, which are included in the allocation page images, is odd as the result obtained by excluding one object to be displayed as the object to be excluded, the list display control unit 101 also displays the object to be displayed, which is paired with the object to be displayed which is excluded as the object to be excluded, as the object to be displayed, which is different from the allocation page image.

When the number of objects to be displayed, which are included in the allocation page images, is odd as the result obtained by excluding one object to be displayed as the object to be excluded, the allocation display control unit 104 allocates the object to be displayed, which is subsequent to and the closest to the allocation page image and corresponds to a single page image, to the allocation page image instead of the object to be excluded.

The list display control unit 101 and the allocation display control unit 104 manage the respective objects to be displayed.

Specifically, the list display control unit 101 and the allocation display control unit 104 store and manage, in the HDD 804, the coordinates (involved in movement caused by dragging) of the present locations of each object to be displayed in a screen, which is determined based on an input operation of the user, or information regarding how many pages are allocated to the present objects to be displayed.

Figure 4:
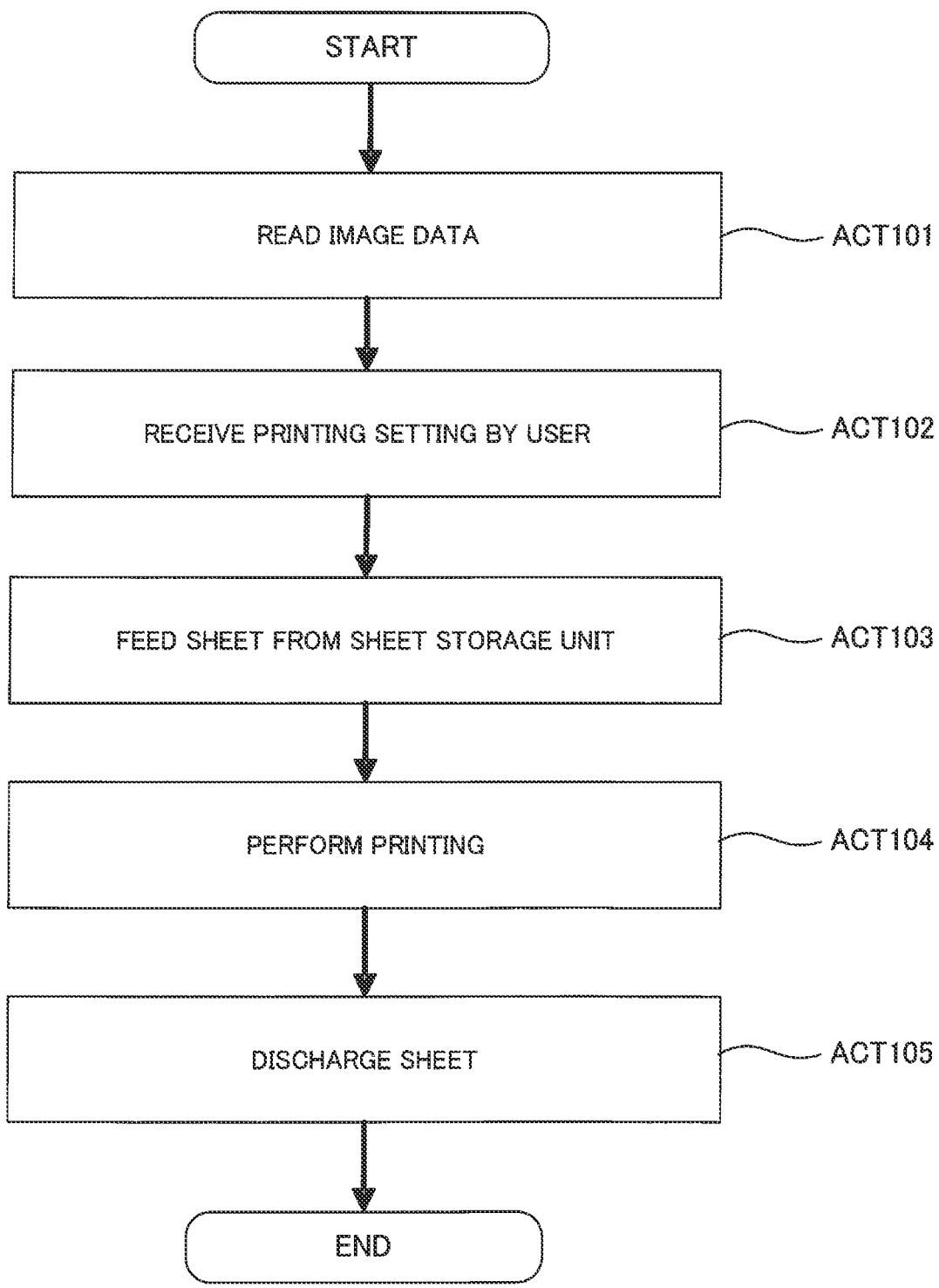
FIG. 4 is a flowchart illustrating the flow of a general process in the display control device.

FIG. 4 is a flowchart illustrating the flow of a general process in the display control device 1.

The processor 801 acquires page images to be printed (ACT 101). Here, the page images may be acquired by scanning images of an original document in the image processing apparatus Q, may be acquired by receiving the images as image data via a network, or may be acquired from a portable recording medium such as a USB memory or an SD card. The processor 801 stores the image data of the page images acquired in the above-described way in, for example, the HDD 804.

Subsequently, the processor 801 transmits the image data of the page images acquired in the above-described way to the touch panel display 805, when the user inputs an instruction to request printing setting on the touch panel display 805.

Based on the input operation of the user on the touch panel display 805, the processor 801 receives the printing setting of the printing which is based on the acquired image data (ACT 102).

Based on the printing setting received in the above-described way, the processor 801 supplies sheets from the sheet storage unit 601 to the printing unit P (ACT 103).

The processor 801 allows the printing unit P to print the acquired image data based on the printing setting (ACT 104).

The processor 801 allows the printing unit P to discharge the sheet subjected to the printing out of the image processing apparatus Q (ACT 105).

Next, the allocation setting of the image processing apparatus Q at the printing setting time will be described according to the exemplary embodiment.

Figure 5:
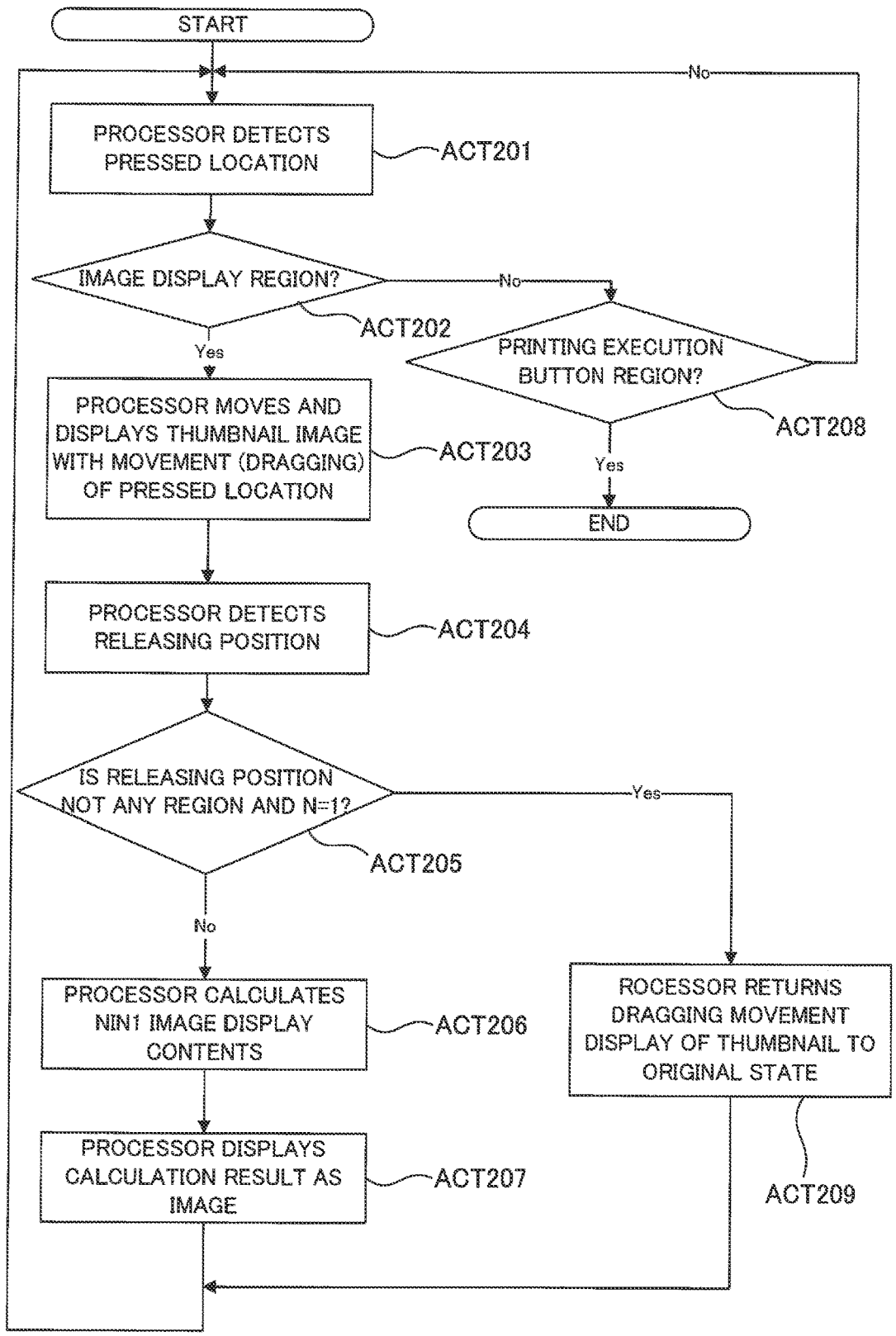
FIG. 5 is a flowchart illustrating the details of a flow of the process (display control method) in the display control device according to the embodiments.

FIG. 5 is a flowchart illustrating the details of a flow of the process (display control method) performed by the display control device 1 according to the exemplary embodiment.

Figure 6:
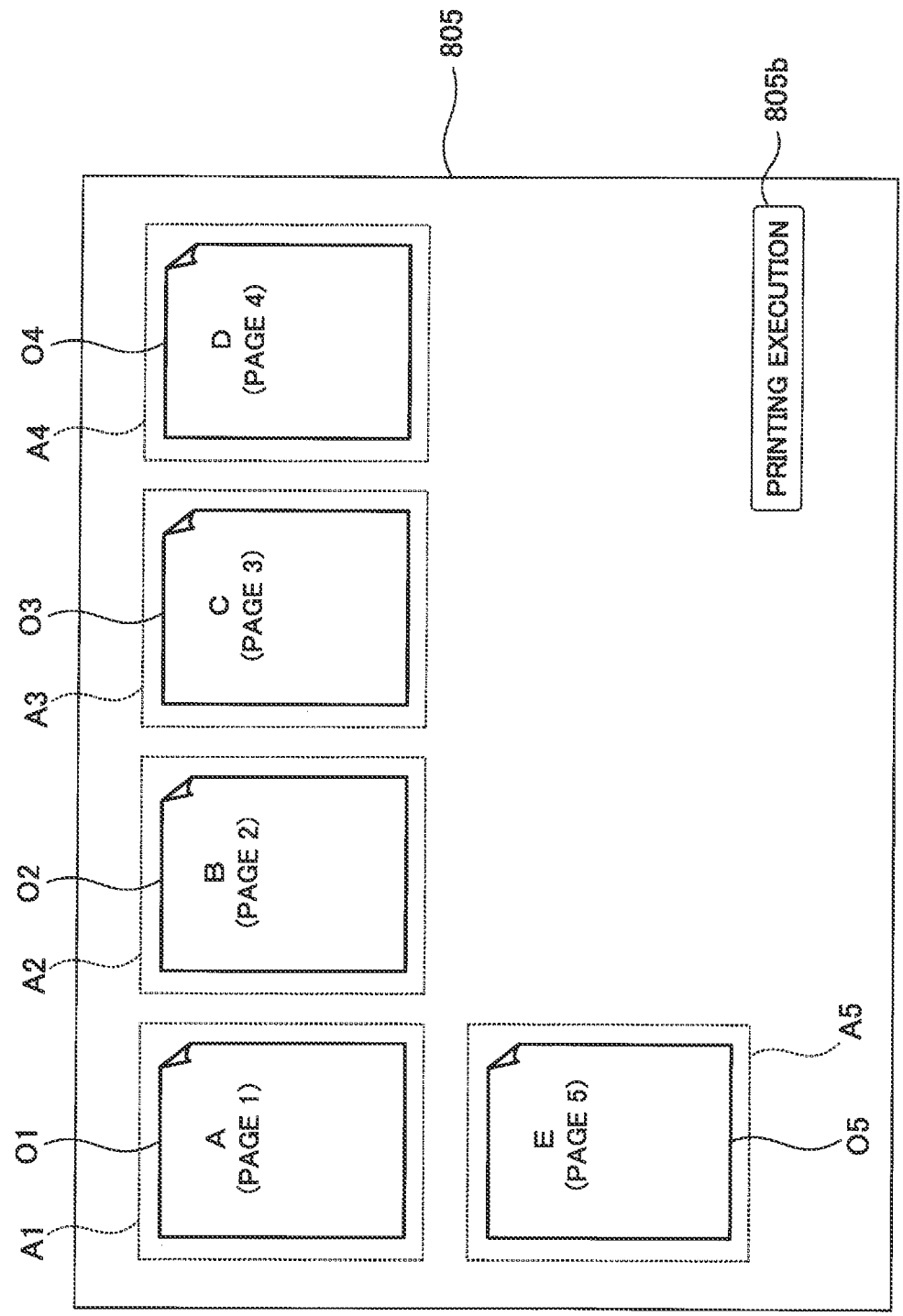
FIG. 6 is a diagram illustrating an operation method in allocation setting.

First, the processor 801 allows the touch panel display 805 to display the printing setting screens shown in FIG. 6 when receiving the printing setting. In the example shown in FIG. 6, five objects O1 to O5 to be displayed, which correspond to five page images to be printed are displayed on the screen. The user operates the touch panel display 805 to execute various kinds of printing setting on the screen shown in FIG. 6 and presses down a printing execution button 805b to execute the printing in accordance with the desired printing setting. Here, for example, the objects O1 to O5 to be displayed are thumbnail images.

FIG. 7 is a diagram illustrating a data table indicating a correspondence relationship between the objects O1 to O5 to be displayed in FIG. 6 and page images P1 to P5 which correspond to the objects O1 to O5 to be displayed, respectively. The data table shown in FIG. 7 is stored in, for example, the HDD 804.

Regions A1 to A5 can correspond to the plurality of objects O1 to O5 to be displayed. The regions A1 to A5 are each a region (which is a region surrounded by a dotted line shown in FIG. 6) which includes each object to be displayed. In the example shown in FIG. 6, the regions A1 to A5 are not normally displayed on a screen. Of course, the regions A1 to A5 may be temporarily displayed when the user selects the object to be displayed.

For example, when the user selects the inside of the region A1 corresponding to the object O1 to be displayed, the processor 801 determines that the object O1 to be displayed is selected in spite of the fact that the selected position does not overlap with the object O1 to be displayed.

Further, when the selected object is moved by an operation of the user, the processor 801 determines the movement destination of the object to be moved based on a contact position of the finger of the user or a stylus pen selecting the object to be moved or the region corresponding to the object to be moved.

Figure 8:
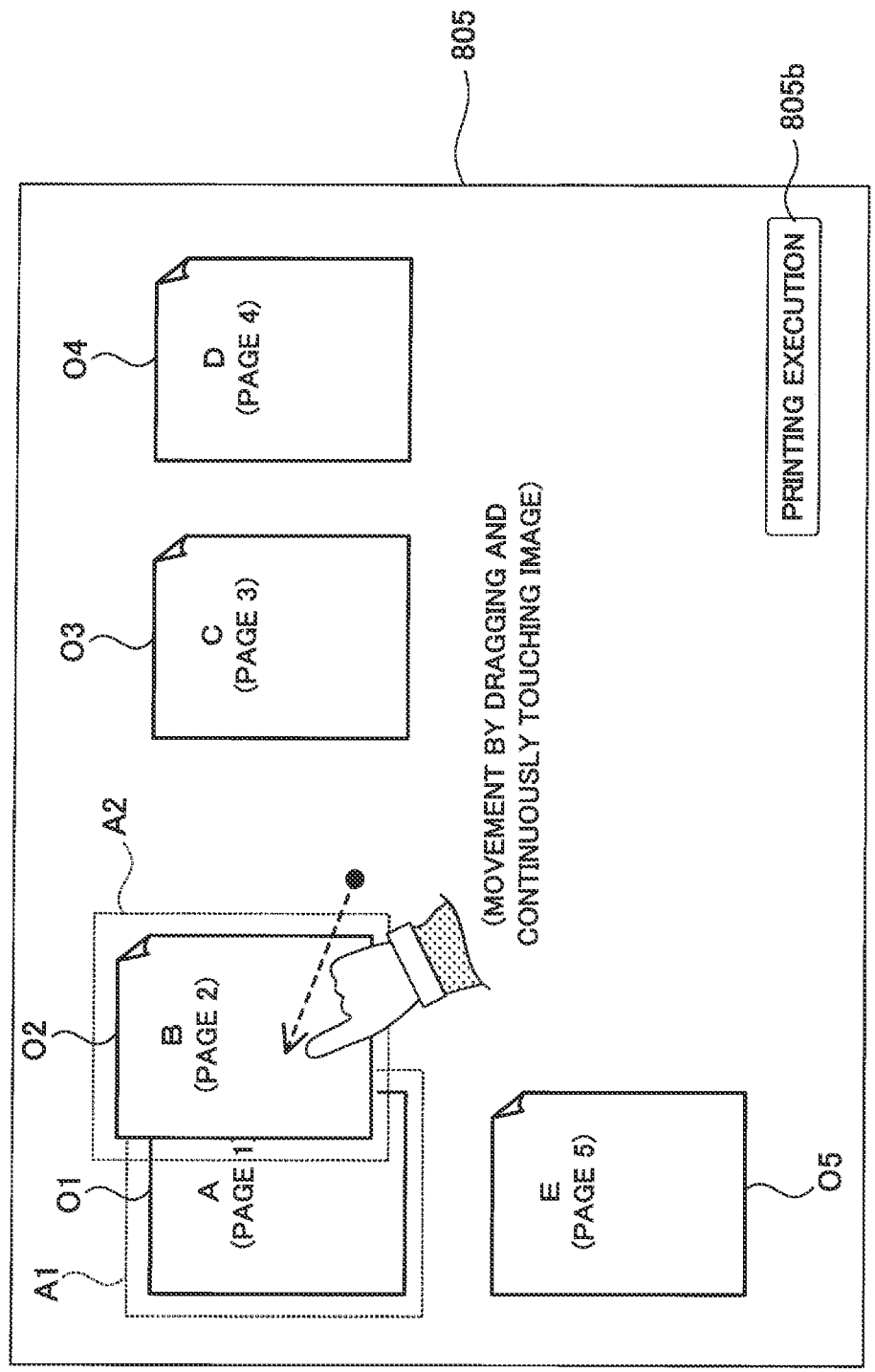
FIG. 8 is a diagram illustrating an operation method in allocation setting.

For example, when releasing is performed in a state where the region A2 corresponding to the object O2 to be displayed, which is the object to be moved, overlaps with the region A1 corresponding to the object O1 to be displayed (for example, a state shown in FIGS. 8 and 9), the processor 801 can determine that the movement destination of the object O2 to be displayed is the object O1 to be displayed.

The processor 801 determines that the regions other than the regions A1 to A5 corresponding to the objects O1 to O5 to be displayed are background regions which do not correspond to the objects O1 to O5 to be displayed on the screen displayed on the touch panel display 805 as in FIG. 6.

First, the processor 801 detects a pressed location of the user on the touch panel display 805 (ACT 201).

Subsequently, the processor 801 determines whether the pressed location is a region corresponding to one of the plurality of objects O1 to O5 to be displayed (ACT 202). When the pressed location is the region corresponding to one of the objects to be displayed, detecting a continuous releasing location starts.

On the other hand, when the pressed location is not the region corresponding to one of the plurality of objects O1 to O5 to be displayed (No in ACT 202) and the pressed location is the printing execution button 805b (Yes in ACT 208), the printing setting ends.

Until releasing (separating the finger of the user or the stylus pen from the touch panel display 805) the processor 801 moves and displays the object to be displayed with the movement of the pressed location (ACT 203).

The processor 801 detects the releasing position of the moved object to be moved (ACT 204). When the releasing position is not the region corresponding to one of the objects to be displayed (Yes in ACT 205), the processor 801 cancels the movement display of the object to be displayed and displays a state (for example, the state shown in FIG. 6) of the original location (ACT 209).

Figure 9:
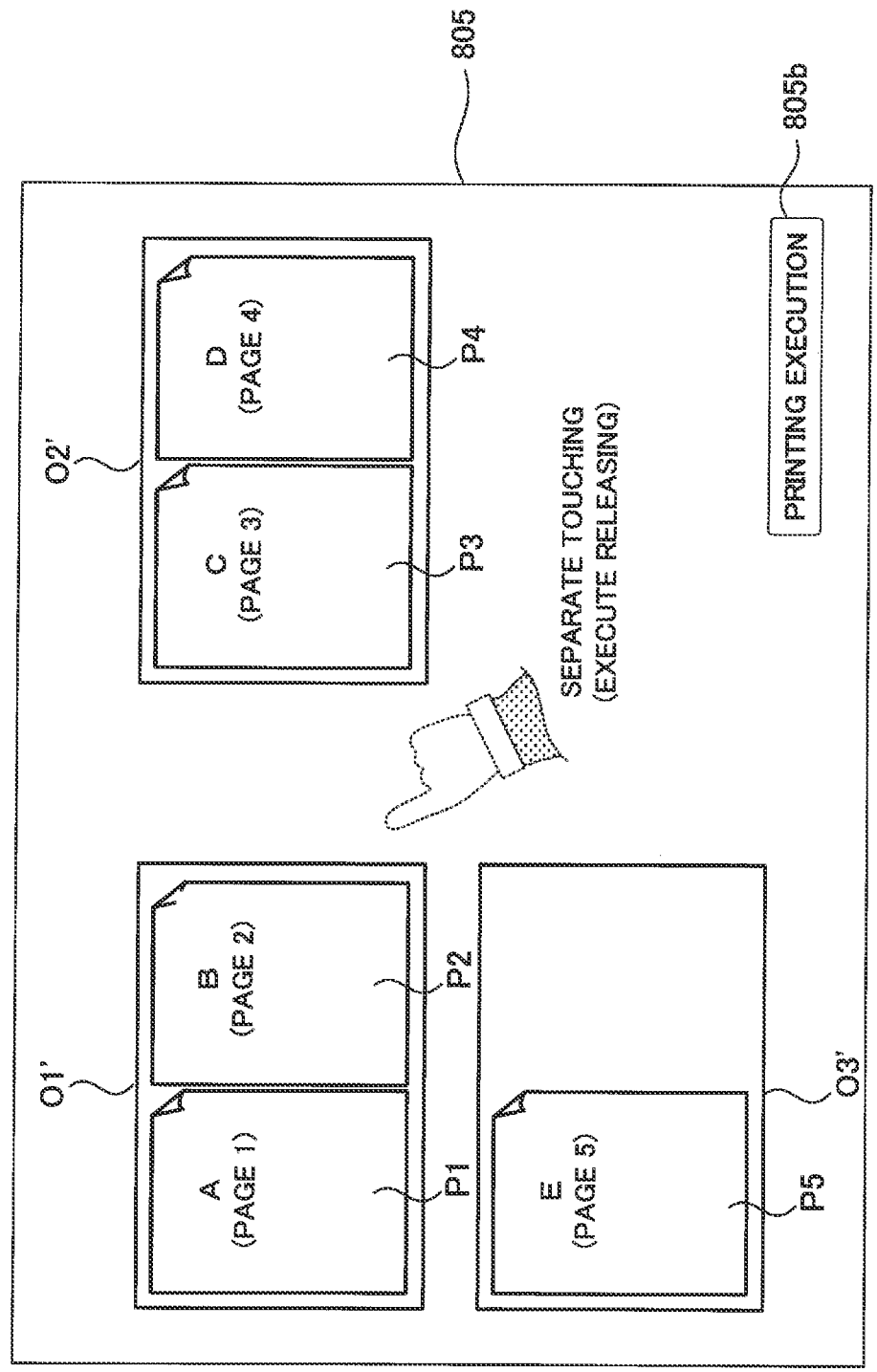
FIG. 9 is a diagram illustrating an operation method in allocation setting.

On the other hand, when the region (for example, the region A1) at which the releasing position of the object to be moved corresponds to one of the objects to be displayed is designated as the movement destination (No in ACT 205), the processor 801 additionally allocates and displays the page image (for example, the page image P2) corresponding to this object (for example, the object O1 to be displayed) to be moved to the object (for example, the region A1) to be displayed, which correspond to the region (for example, the region A1) selected as the movement destination by the releasing (ACT 206 and ACT 207) (for example, see FIG. 9).

FIG. 10 is a diagram illustrating an example of a data table stored in the HDD 804 in the state shown in FIG. 9.

In the example shown in FIG. 9, the allocation number of page images per page determined by operating the displayed objects is applied to all the pages, but the invention is not limited thereto. For example, in the example shown in FIG. 8, only the page images P1 and P2 are displayed as a 2 in 1 image and the other page images remain as 1 in 1 images.

Figure 11:
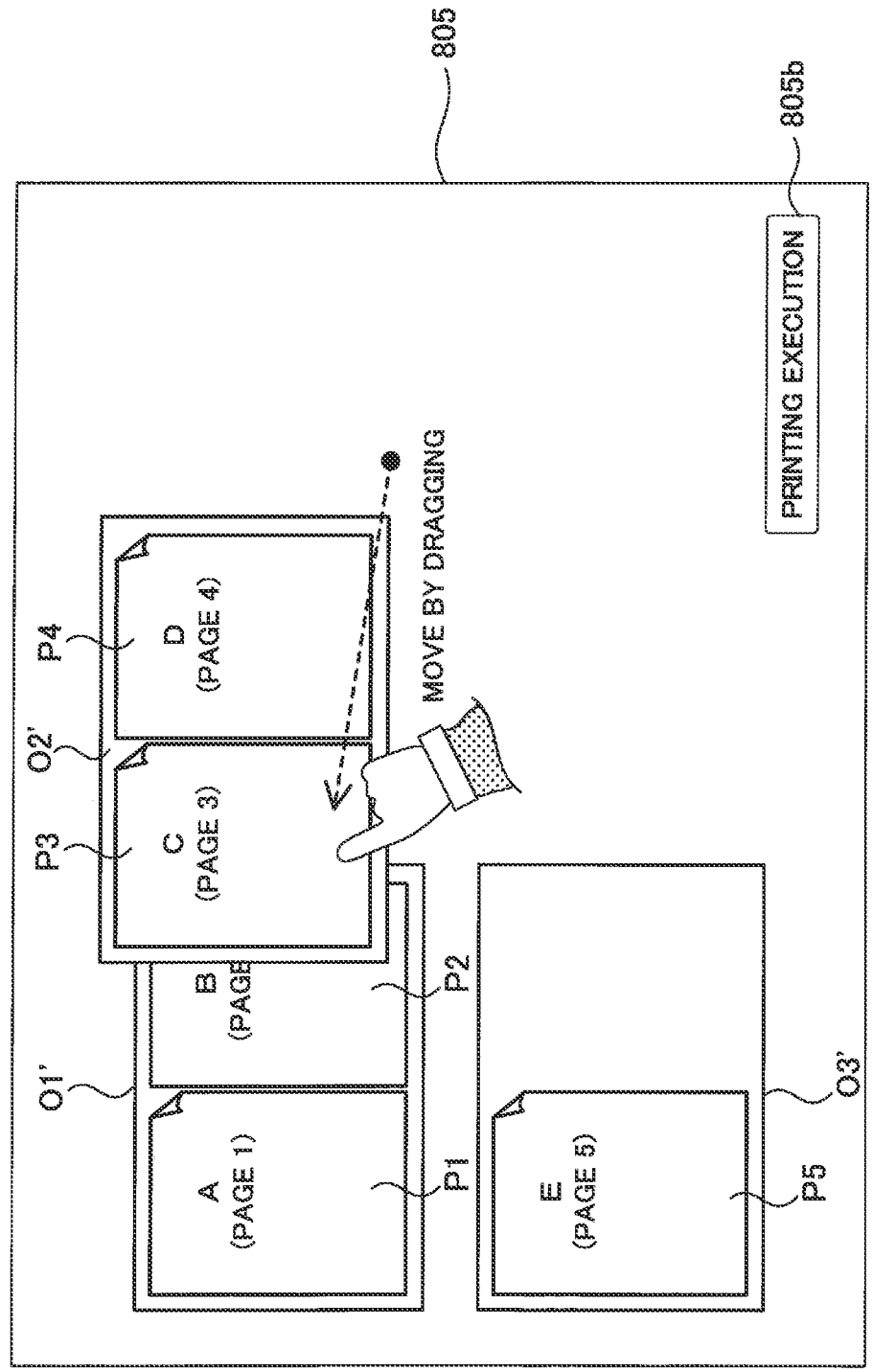
FIG. 11 is a diagram illustrating an operation method in allocation setting.
Figure 12:
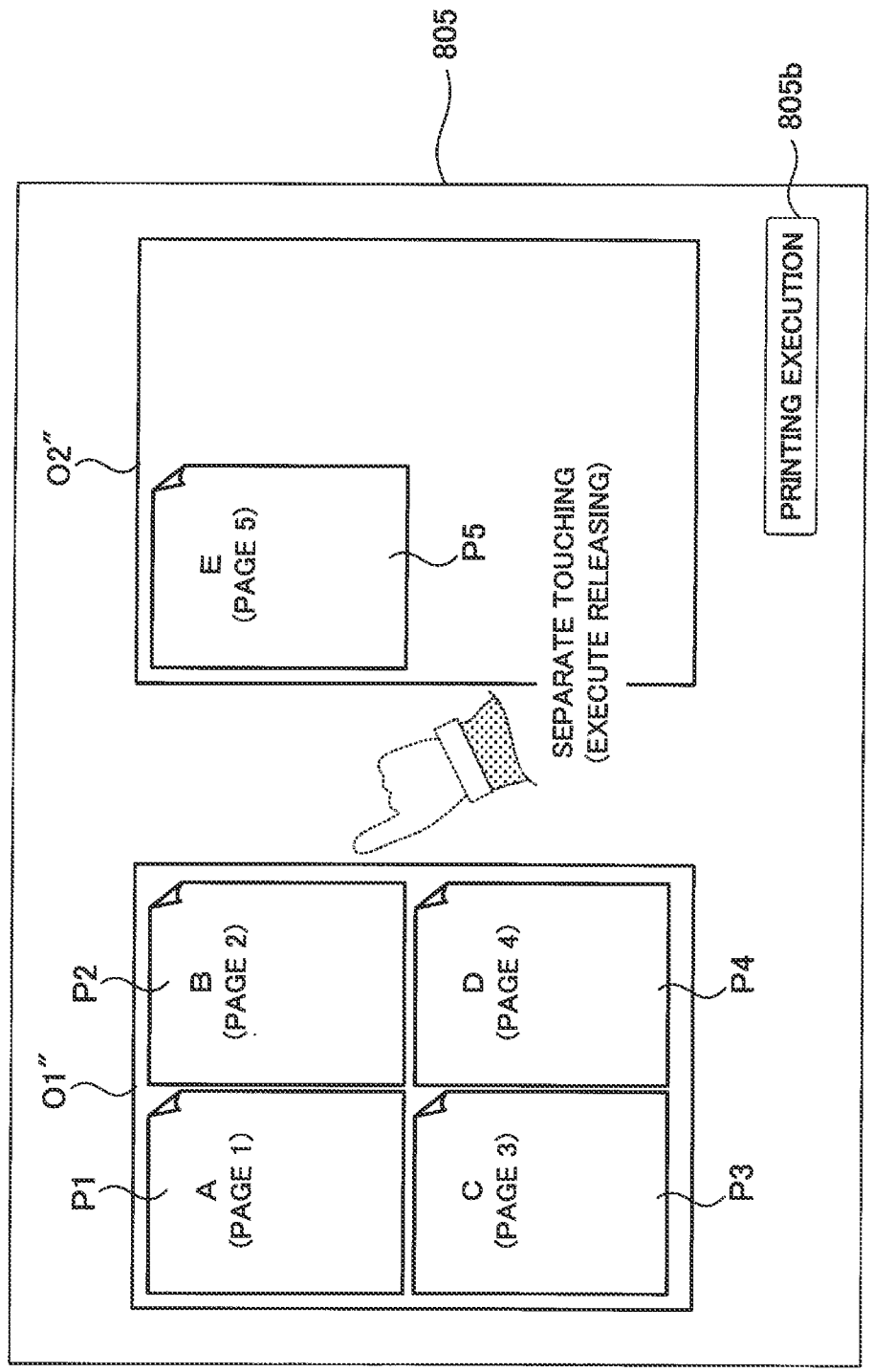
FIG. 12 is a diagram illustrating an operation method in allocation setting.

As shown in FIG. 9, when 2 in 1 allocation is set for all the pages, the processor 801 displays an object O1" to be displayed in a state where all of the page images P1, P2, P3, and P4 allocated to two objects O1' and O2' to be displayed are rearranged so as to be allocated to a single page (4 in 1), as shown in FIG. 12, for example, in a case (FIG. 11) where the region corresponding to the object O2' to be moved is released over the region corresponding to the object O1' to which two page images are allocated.

FIG. 13 is a diagram illustrating an example of a data table stored in the HDD 804 in the state shown in FIG. 12.

Next, an example of an operation will be described in which 4 in 1 or 2 in 1 allocation is set, and then the allocation number of page images per page is returned to 2 in 1 or 1 in 1.

Figure 14:
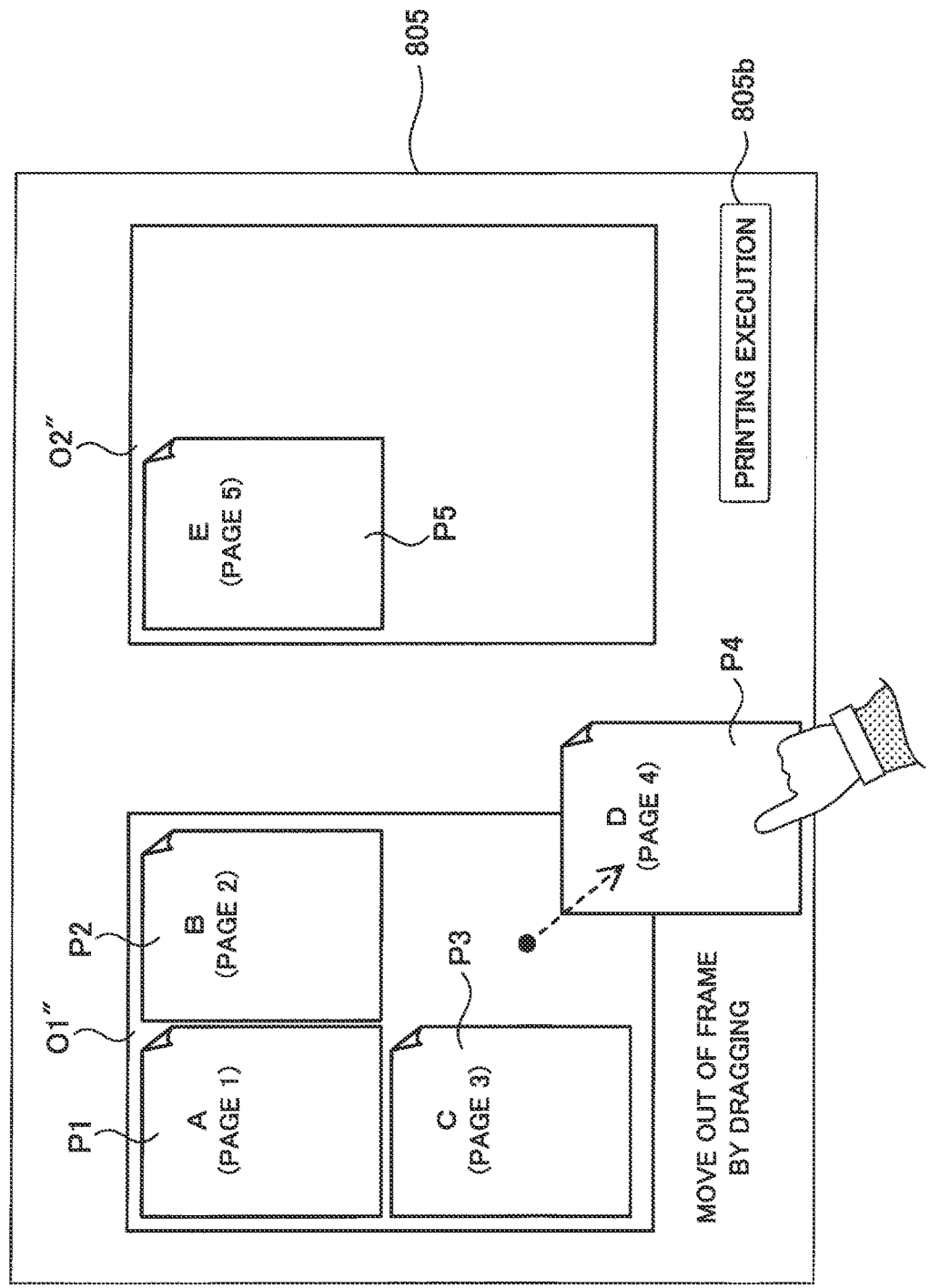
FIG. 14 is a diagram illustrating an operation method in allocation setting.

For example, as shown in FIG. 14, when the user drags the page image P4 allocated to the object O1" on the touch panel display 805, moves the page image P4 out of the region corresponding to the object O1' to be displayed, and releases the page image P4 (FIG. 15), the page images P4 and P3 managed as a pair of images are excluded from the objects O1' to be displayed for allocation.

Figure 15:
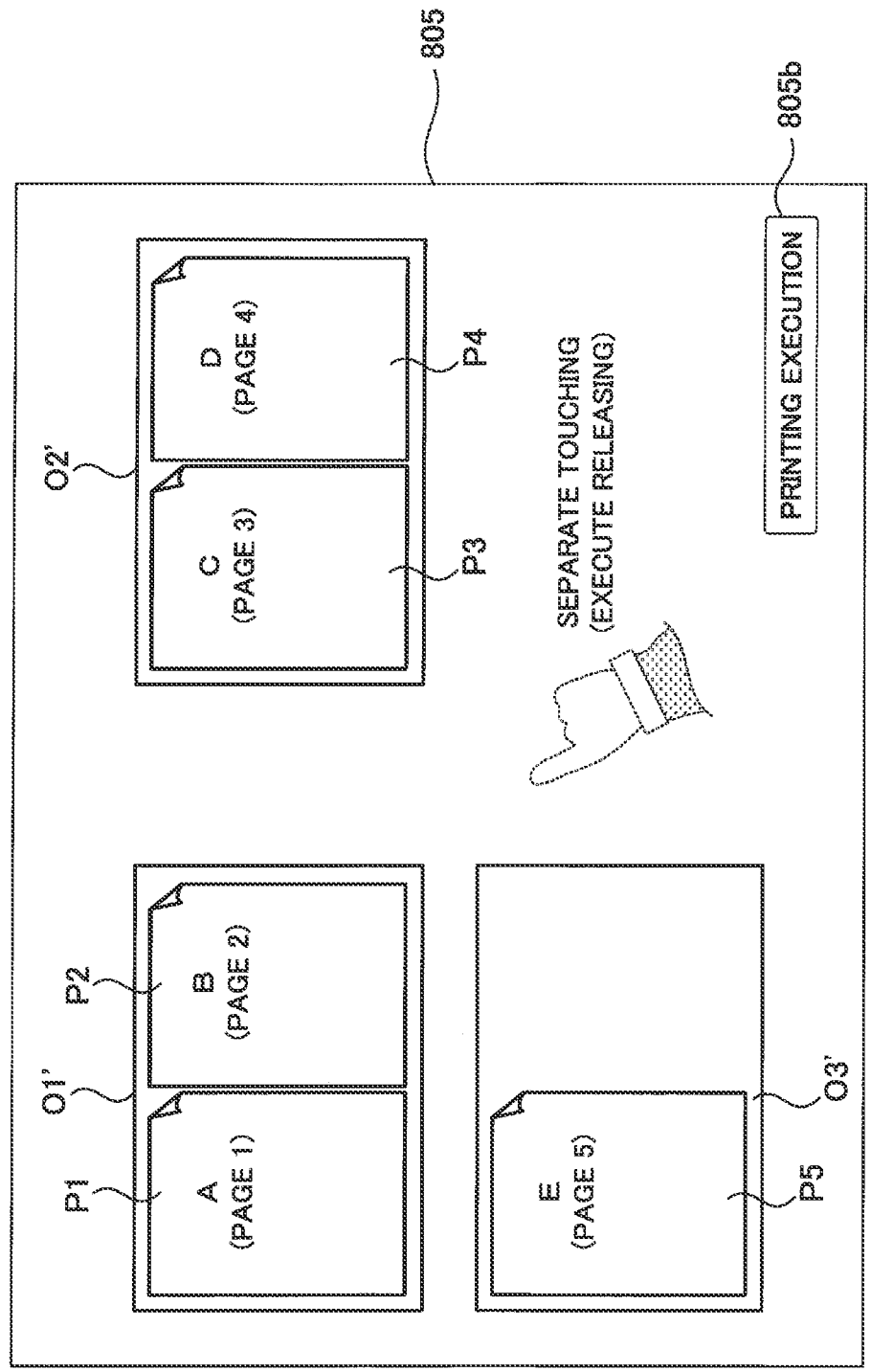
FIG. 15 is a diagram illustrating an operation method in allocation setting.

Since the page images remaining to be allocated to the objects O1' to be displayed are only the page images P1 and P2, the two page images are in the same display state as the state of the object O1' to be displayed as the 2 in 1 image (see FIG. 15).

The processor 801 switches the screen display to the display state shown in FIG. 15 and changes the contents of the data table to the state shown in FIG. 10.

Figure 16:
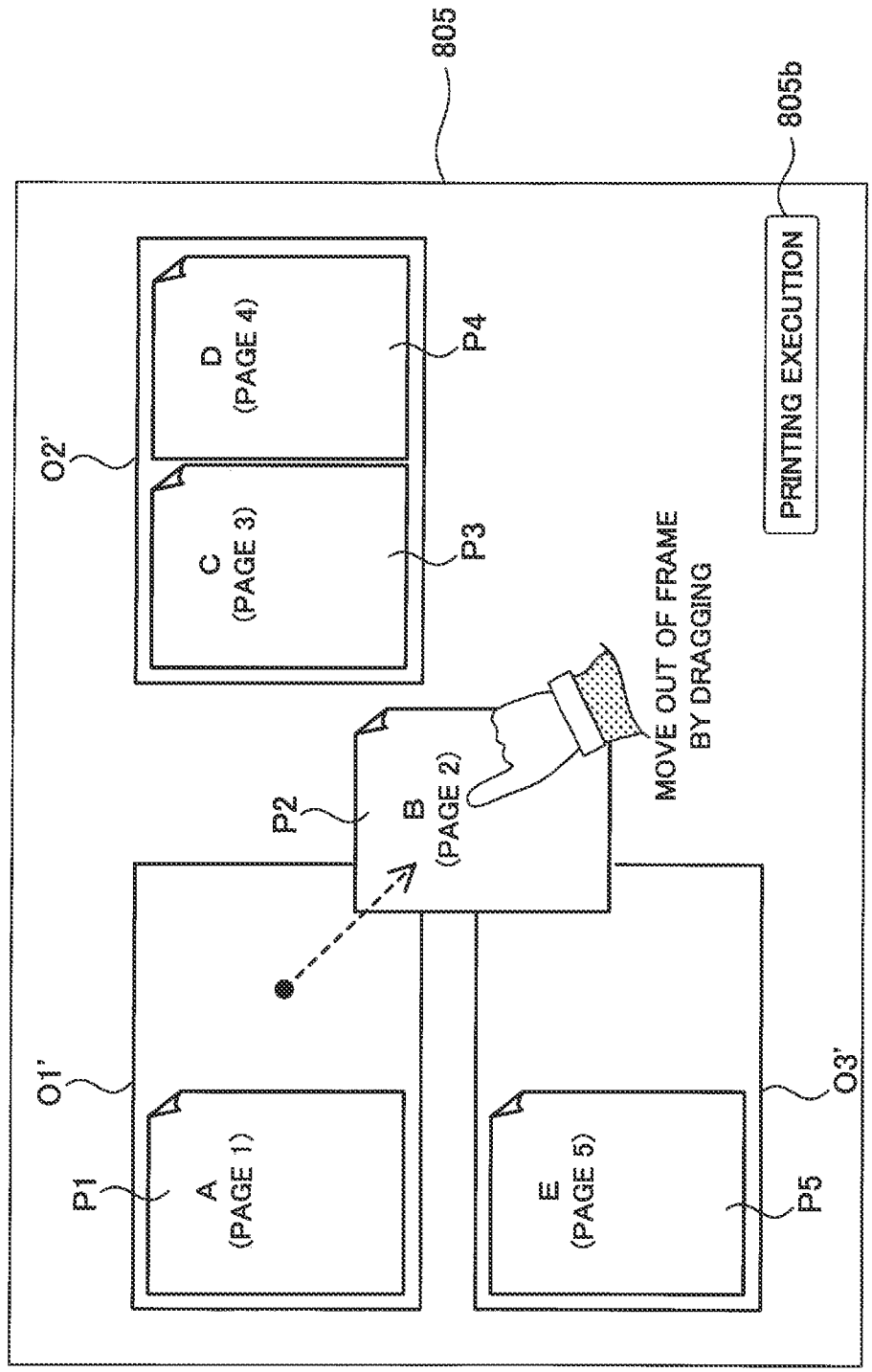
FIG. 16 is a diagram illustrating an operation method in allocation setting.

For example, when the page image P2 is dragged so as to be moved out of the region corresponding to the object O1' to be displayed and is released (FIG. 16) from the state shown in FIG. 15, the 2 in 1 setting of the objects O1' to O3' is canceled and all the objects to be displayed become the 1 in 1 display state, as shown in FIG. 6.

By combining the above-described operations and setting any allocation, the desired page images can be assigned to the desired objects to be displayed with the desired number of page images. Accordingly, for example, by setting documents of all the ten pages (page images P1 to P10) for allocation, flexible allocation setting can be achieved as follows:

page images P1 to P4: 4 in 1 setting,
page images P5 to P8: 3 in 1 setting, and
page images P9 and P10: 2 in 1 setting.

When such allocation is set and then the processor 801 detects pressing of the printing execution button 805b of the user, the printing is performed in the allocation setting.

Each operation in the process of the above-described display control device is realized by causing the processor 801 to execute a display control program stored in the memory 802.

According to this exemplary embodiment, the lesser operation load and more flexible allocation setting can be achieved in comparison to the user interface according to the related art in which it is necessary to operate a plurality of taps, buttons, or the like in order to reach an operation screen on which the allocation is set.

Further, in the above-described exemplary embodiment, the case was described in which the allocation printing is set on the printing setting screen, but the invention is not limited thereto. For example, the technique described in this exemplary embodiment can be applied, for example, even when allocation of a plurality of pages is desired to be set in word processor software.

Of course, as a determination criterion used to determine which object to be displayed is the movement destination object at the time of moving the above-described object to be moved, a determination criterion such as a selection rule used at the time of moving a file to be moved to a movement destination folder in a known operating system or the like.

Other Embodiments

Next, other exemplary embodiments will be described.

In the above-described exemplary embodiment, a setting method of allocating a plurality of page images on one surface of a single page was described. In an exemplary embodiment, a setting method of allocating page images to the front surface and the rear surface of a single page will be described.

First, double-side allocation setting based on two display state of 1 in 1 images will be described.

Figure 17:
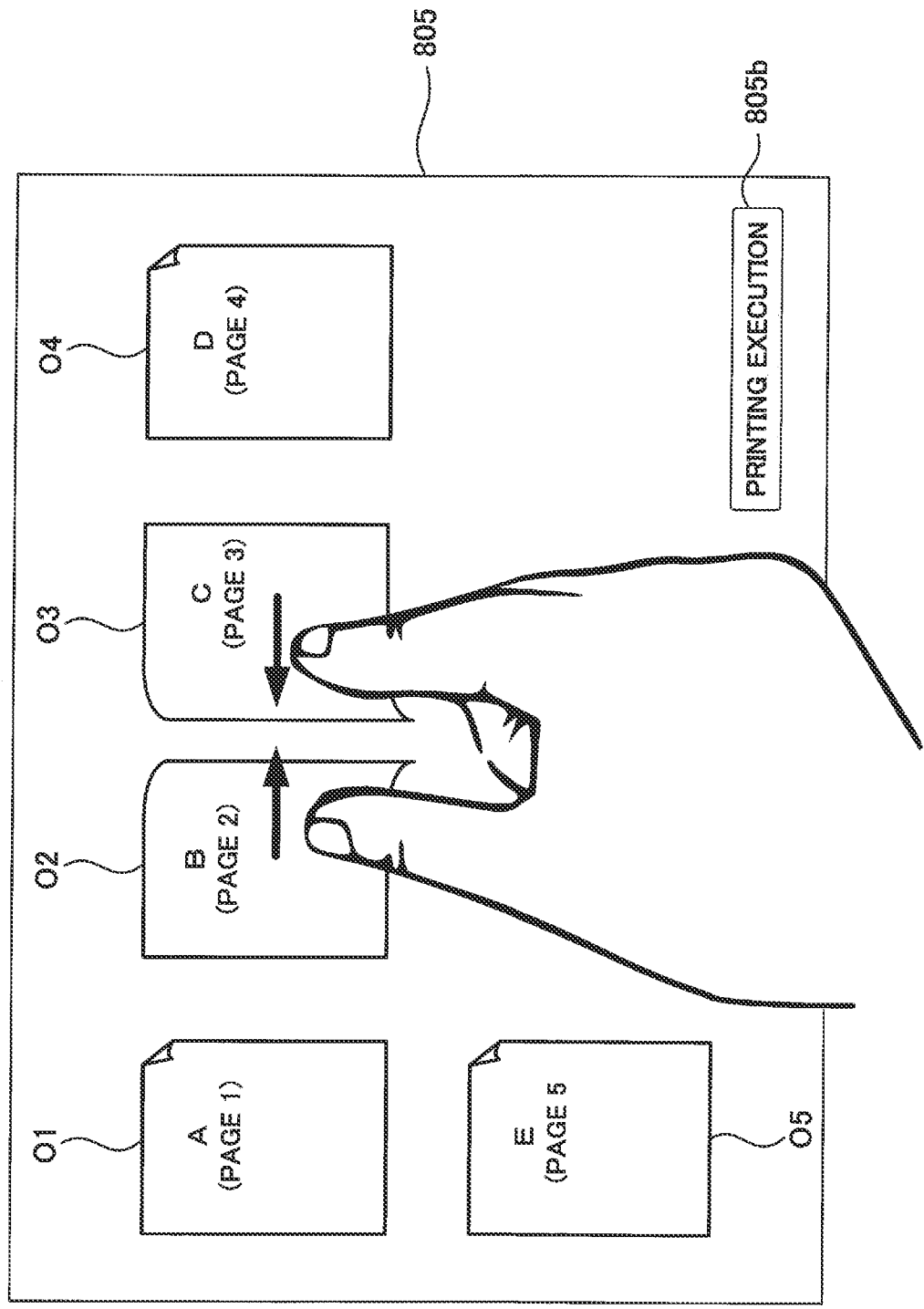
FIG. 17 is a diagram illustrating an operation method in allocation setting.
Figure 18:
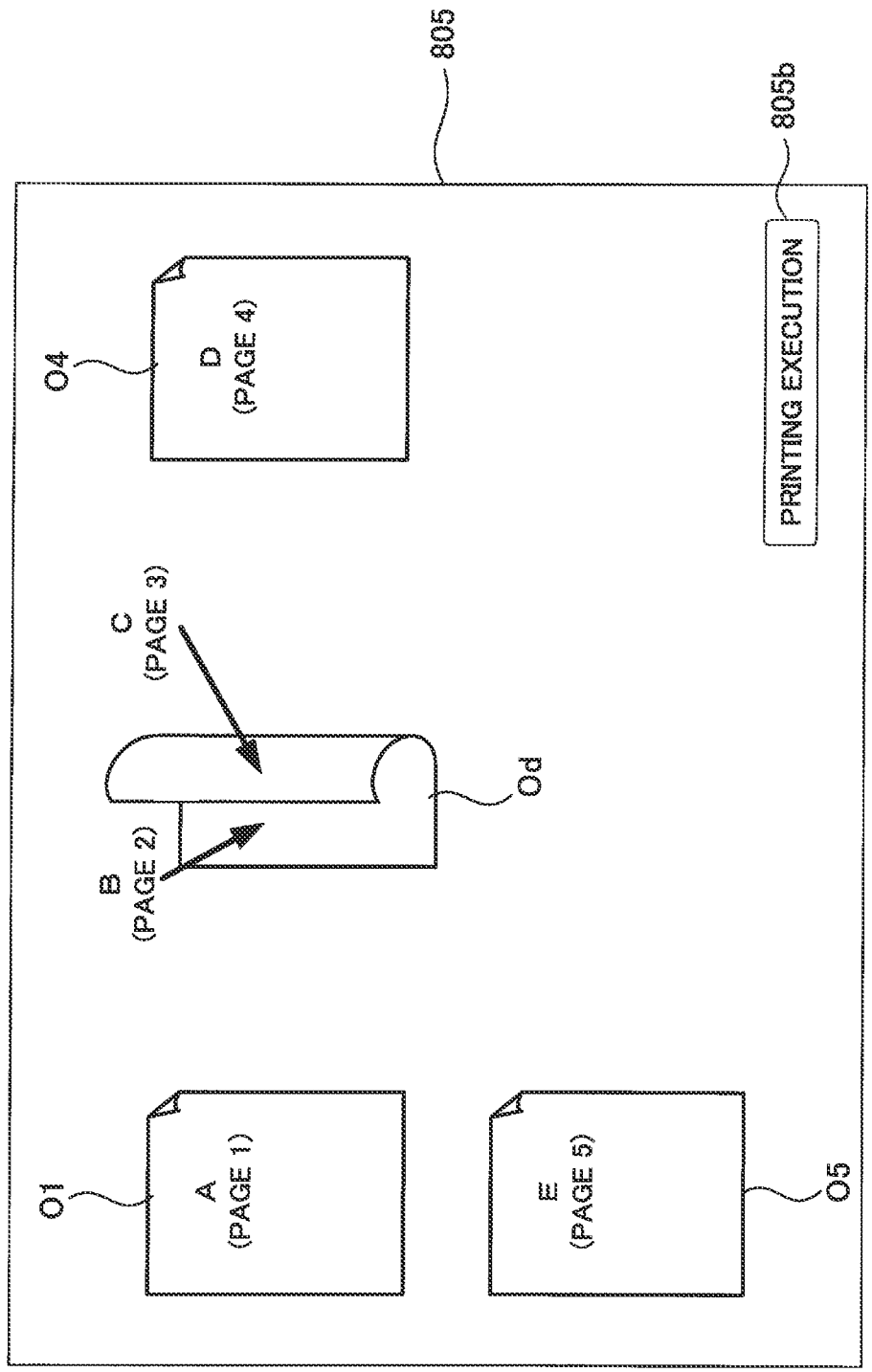
FIG. 18 is a diagram illustrating an operation method in allocation setting.

For example, when the user operates the touch panel display 805 to simultaneously select two objects O2 and O3 to be displayed and to move and draw both of the objects to be mutually moved so that the movement destination of one of the two objects to be displayed becomes the other object to be moved, as shown in FIG. 17, the processor 801 displays a double-side allocation image being in a state where one object to be moved can be allocated to the front surface of a single sheet and the other object to be moved can be allocated to the rear surface of the single sheet (FIG. 18).

In this way, the processor 801 displays the double-side allocation image being in the state where the objects to be displayed, which correspond to the page images on both surfaces of a single sheet.

Next, an operation of returning two page images P2 and P3 set to be allocated to both surfaces to the original one-side allocation state will be described.

When the exclusion object determination unit 105 selects two points inside the region corresponding to the double-side allocation image and determines the two points are separated from each other in a separation direction, the list display control unit 101 displays the objects to be displayed, which correspond to the page images allocated as the double-side allocation image, as mutually independent objects to be displayed.

Figure 19:
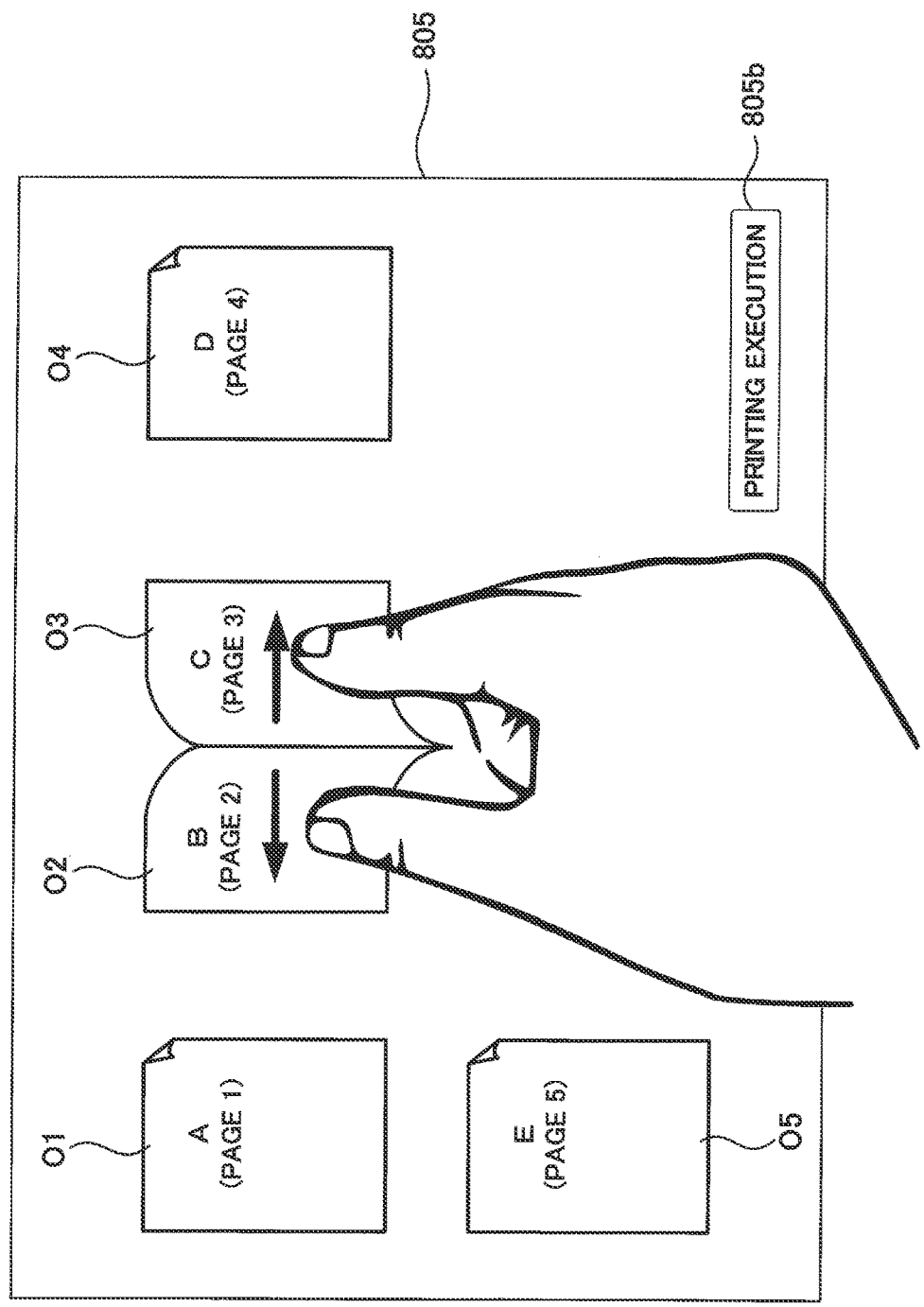
FIG. 19 is a diagram illustrating a form in which two objects to be displayed, allocated to one double-side allocation image selected by a user, are separated from each other in the drawn state.

FIG. 19 is a diagram illustrating a form in which two objects to be displayed, which can be allocated to one double-side allocation image selected by a user, are separated from each other in the drawn state.

Of course, when the objects to be displayed, which are operated so as to be drawn to each other in the above-described way, are set mutually as a 2 in 1 image, the double-side page images of the double-side allocation image are allocated as a 2 in 1 image.

In the above-described exemplary embodiments, the embodiment of the image processing apparatus having a principal function of the display control device was described, but the invention is not necessarily limited thereto. For example, a printer driver or an application program may be configured in the client terminal 7.

Further, a computer forming the display control device can supply a program executing the above-described processes as a display control program. In the exemplary embodiments, the program realizing the functions of the invention is recorded in advance in the storage region provided inside the apparatus, but the invention is not limited thereto. Instead, the same program may be downloaded to the apparatus via a network or the same program stored in a computer-readable recording medium may be installed to an apparatus. Any recording medium may be used as long as the recording medium can store the program and a computer can read the program from the recording medium. Specifically, examples of the recording medium include an internal storage device, such as a ROM or a RAM, mounted in a computer, a portable storage medium such as a CD-ROM, a flexible disc, a DVD disc, a magneto-optical disc, or an IC card, a database retaining a computer program, the database on another computer, or a transmission medium on a line. A function of installing or downloading the program in this way cooperated with an internal OS (Operating System) inside the apparatus may be realized.

Apart or the entirety of the program may be an execution module dynamically generated.

Of course, in the above-described exemplary embodiments, at least some of various processes realized by causing a processor to execute the program may be executed by a circuit of the ASIC 802.

As described in detail above, it is possible to provide the technique described in the specification to reduce an operation load of the operations of allocating the plurality of page images to a single page.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A display control device comprising:
   a display;
   an input reception unit configured to receive operational input from a user;
   a processor; and
   one or more modules stored in a memory and configured for execution by the processor, the one or more modules including instructions:
      to display a plurality of single-sided objects on the one display, each single-sided object indicating that a page image is printed on only one side of a sheet:
      to update two single-sided objects to a single two-sided object in response to receiving an operation to select two single-sided objects and an operation to move both two single-sided objects in a mutually approaching direction, the two-sided object indicating that page image is printed on both sides of a sheet; and
      to update the single two-sided object to the two single-sided objects in response to receiving an operation to select the both sides of the sheet indicated by the two-sided object, respectively and an operation to separate the both sides of the sheet away from each other.

2. The device according to claim 1, wherein the single-sided object indicates the number of pages to be printed of the document and the both sides of the sheet indicated by the two-sided object indicate the number of pages to be printed of the document.

3. An image processing device comprising the device according to claim 1.

4. A client terminal comprising the device according to claim 1.

5. A display control method comprising:
   receiving operational input from a user;
   displaying a plurality of single-sided objects on one display, each single-sided object indicating that a page image is printed on only one side of a sheet:
   updating two single-sided objects to a single two-sided object in response to receiving an operation to select both two single-sided objects and an operation to move both two single-sided objects in a mutually approaching direction, the two-sided object indicating that the page image is printed on both sides of a sheet; and
   updating the single two-sided object to the two single-sided objects in response to receiving an operation to select the both sides of the sheet indicated by the two-sided object, respectively and an operation to separate the both sides of the sheet away from each other.

6. The method according to claim 5, wherein the single-sided object indicates the number of pages to be printed of the document and the both sides of the sheet indicated by the two-sided object indicate the number of pages to be printed of the document.

\* \* \* \* \*